(12) United States Patent
Jinno

(10) Patent No.: US 12,693,230 B2
(45) Date of Patent: Jul. 28, 2026

(54) IMAGE PROCESSING APPARATUS, IMAGE PROCESSING METHOD, AND NON-TRANSITORY COMPUTER-READABLE MEDIUM

(71) Applicant: CANON KABUSHIKI KAISHA, Tokyo (JP)

(72) Inventor: Takayuki Jinno, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 124 days.

(21) Appl. No.: 18/785,278

(22) Filed: Jul. 26, 2024

(65) Prior Publication Data

US 2025/0076205 A1 Mar. 6, 2025

(30) Foreign Application Priority Data

Sep. 4, 2023 (JP) ................................. 2023-143176

(51) Int. Cl.
| | |
|---|---|
| *G01N 21/88* | (2006.01) |
| *G06T 5/50* | (2006.01) |
| *G06T 7/00* | (2017.01) |
| *G06T 7/20* | (2017.01) |
| *G06T 7/50* | (2017.01) |

(52) U.S. Cl.
CPC ..... *G01N 21/8806* (2013.01); *G01N 21/8851* (2013.01); *G06T 5/50* (2013.01); *G06T 7/0008* (2013.01); *G06T 7/20* (2013.01); *G06T 7/50* (2017.01); *G06T 2207/20221* (2013.01)

(58) Field of Classification Search
CPC ........... G06T 5/50; G06T 7/0008; G06T 7/20; G06T 7/50; G06T 2207/20221; G01N 21/8806; G01N 21/8851
See application file for complete search history.

(56) References Cited

U.S. PATENT DOCUMENTS 11,328,679 B2 5/2022 Jinno
2019/0265172 A1* 8/2019 Koseki .................... G06T 7/174

FOREIGN PATENT DOCUMENTS

JP 2003-240539 A 8/2003
JP 2016035405 A * 3/2016

* cited by examiner

*Primary Examiner* — Kevin K Pyo
(74) *Attorney, Agent, or Firm* — Venable LLP

(57) ABSTRACT

An image processing apparatus is provided. The apparatus acquires a plurality of captured images acquired by shooting an inspection target object under a plurality of illumination conditions. The apparatus performs a first inspection for inspecting a surface profile of the inspection target object based on a normal image indicating a normal direction of each position of the inspection target object. The normal image is generated from the plurality of captured images. The apparatus performs a second inspection for inspecting a surface profile of the inspection target object based on the plurality of captured images, the second inspection being different from the first inspection.

17 Claims, 13 Drawing Sheets

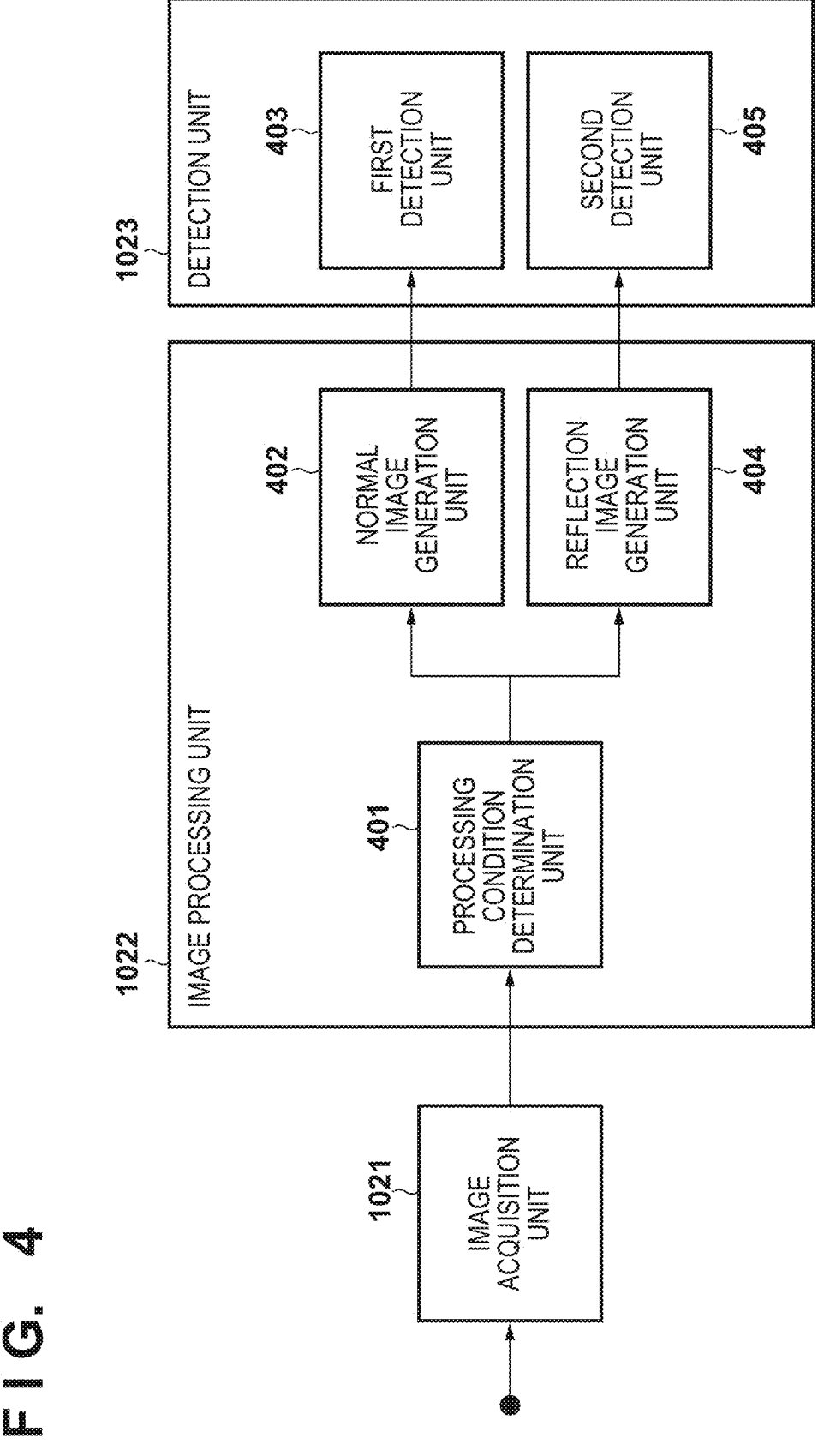
F I G.  4

FIG. 5

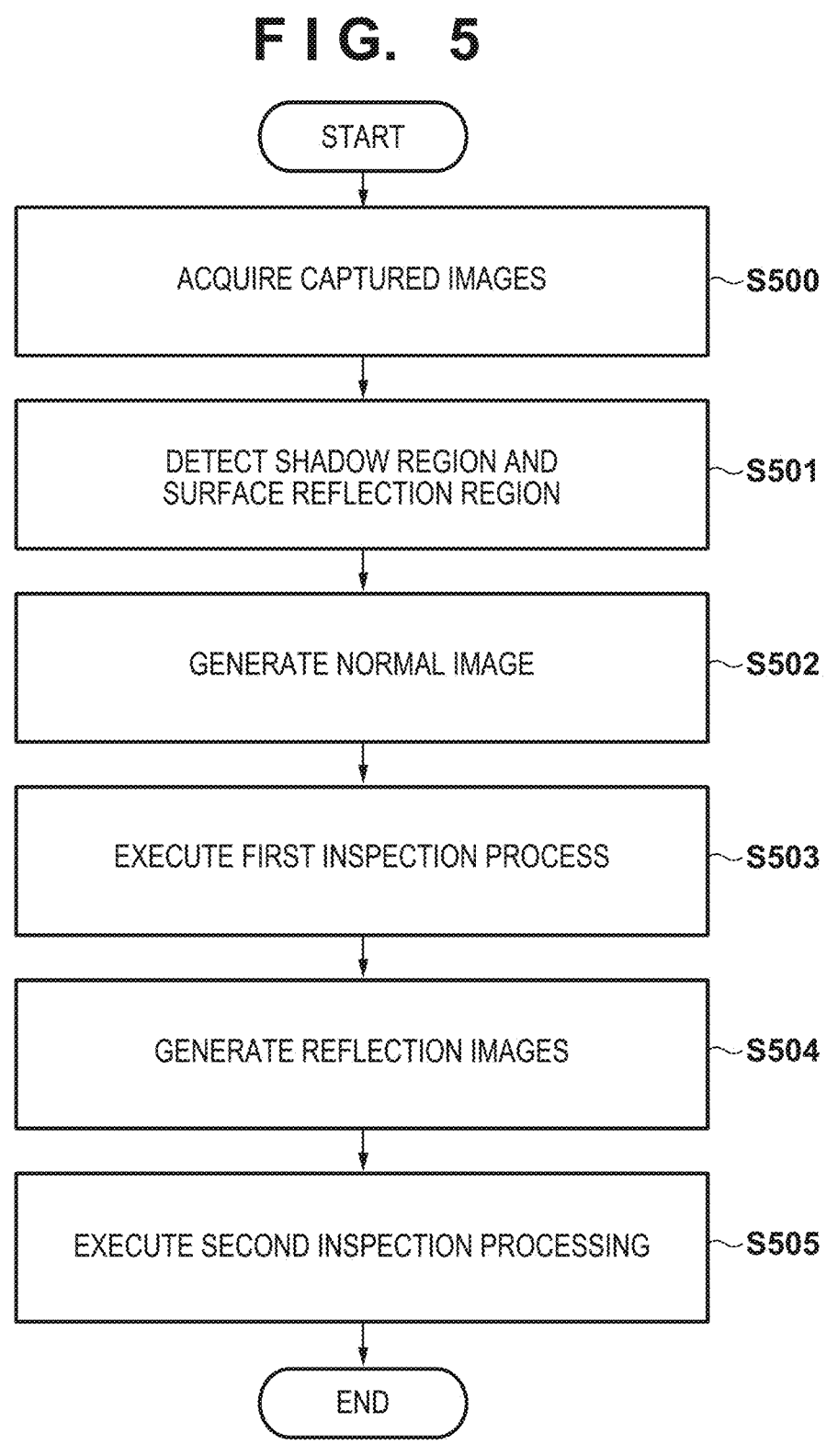

START

ACQUIRE CAPTURED IMAGES — S500

DETECT SHADOW REGION AND
SURFACE REFLECTION REGION — S501

GENERATE NORMAL IMAGE — S502

EXECUTE FIRST INSPECTION PROCESS — S503

GENERATE REFLECTION IMAGES — S504

EXECUTE SECOND INSPECTION PROCESSING — S505

END

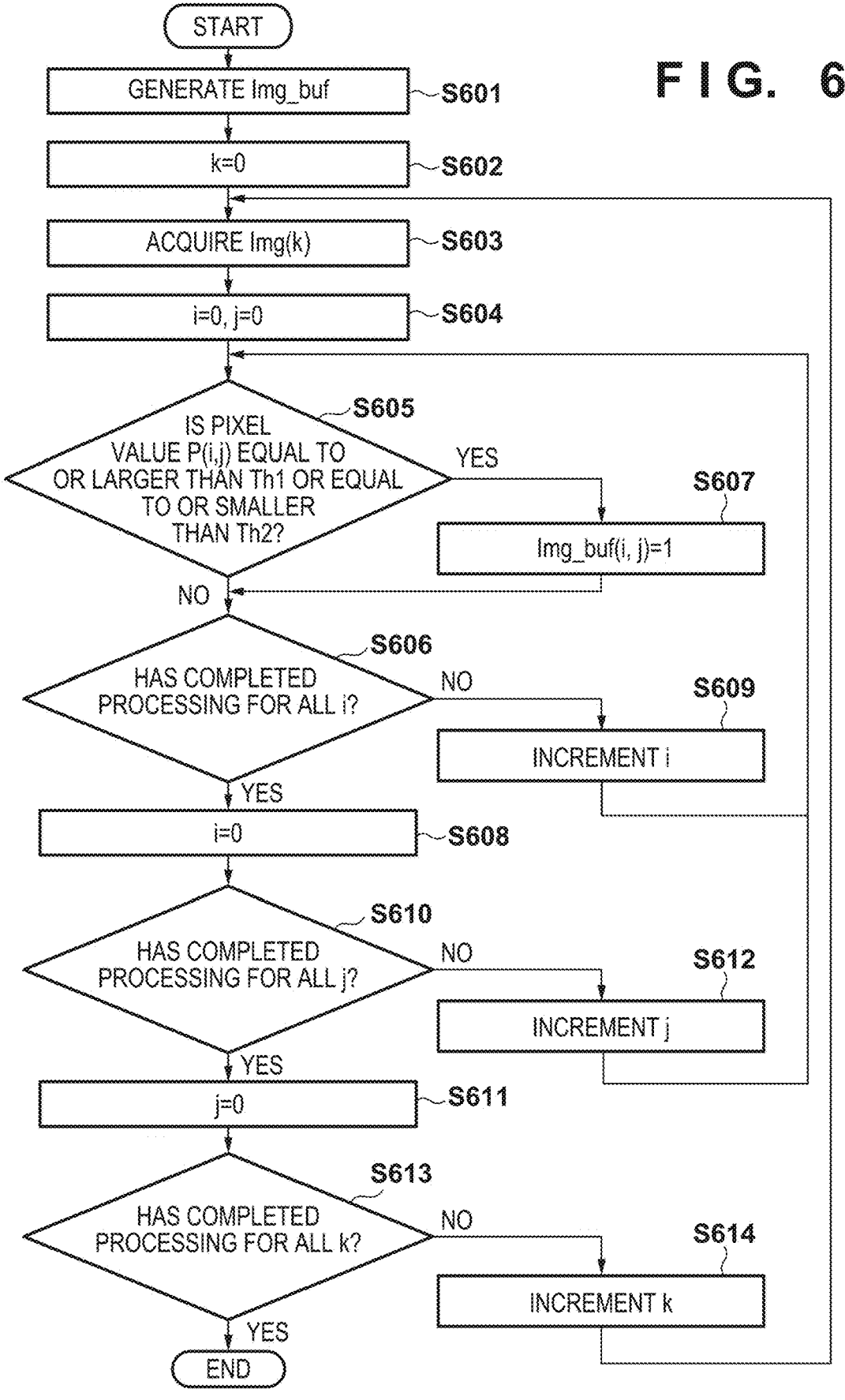
F I G.  6

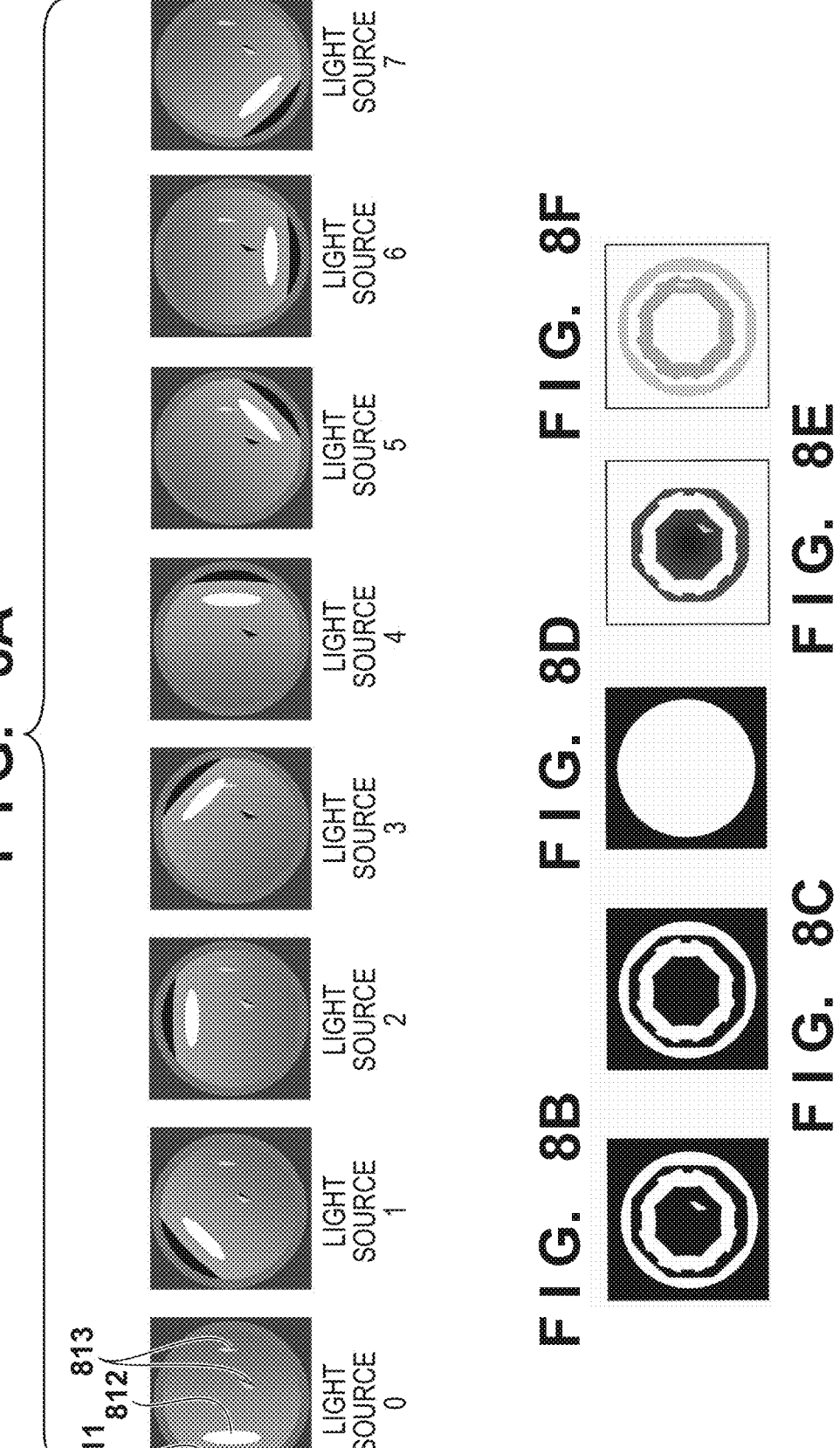

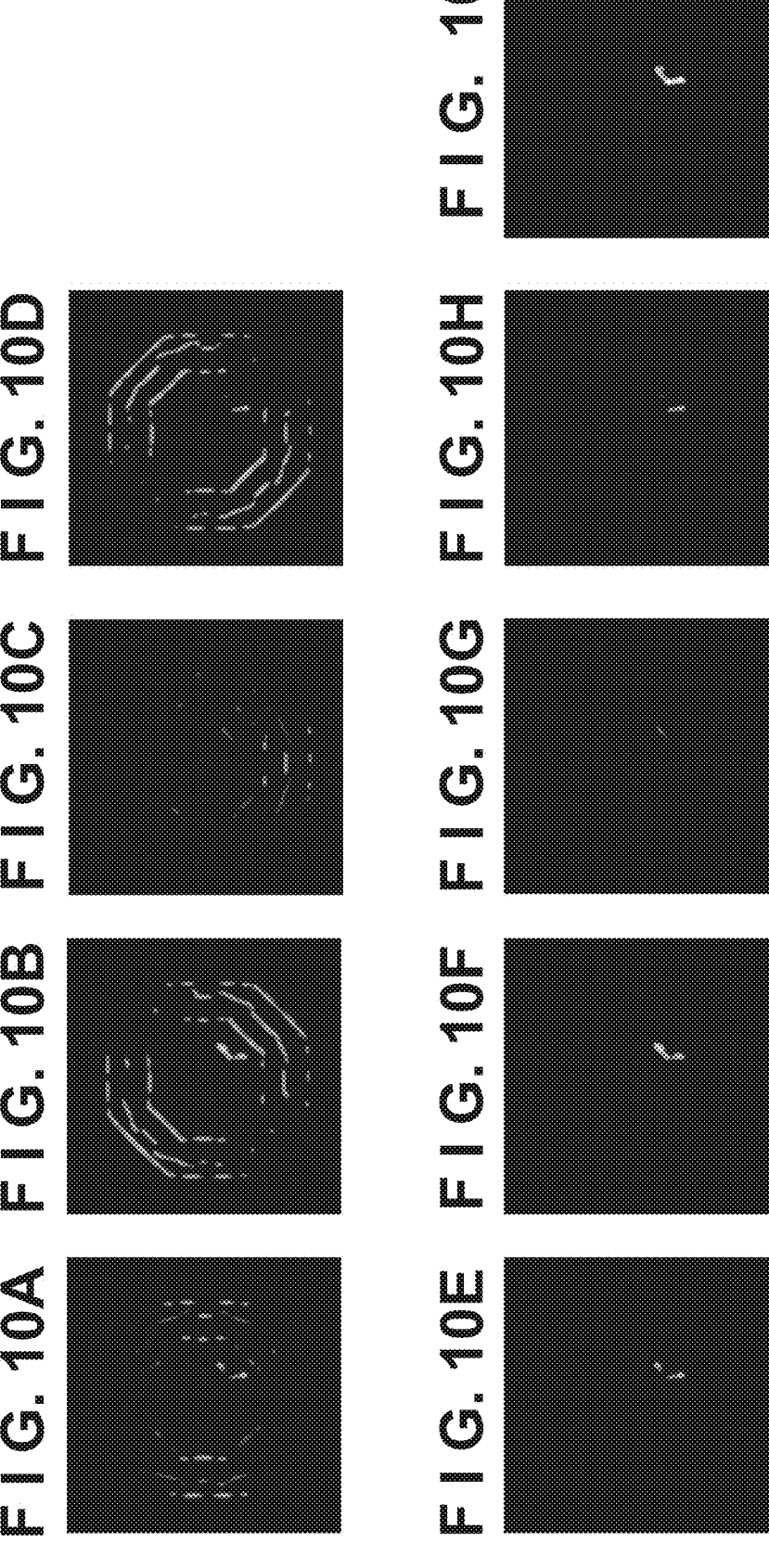

F I G.   13
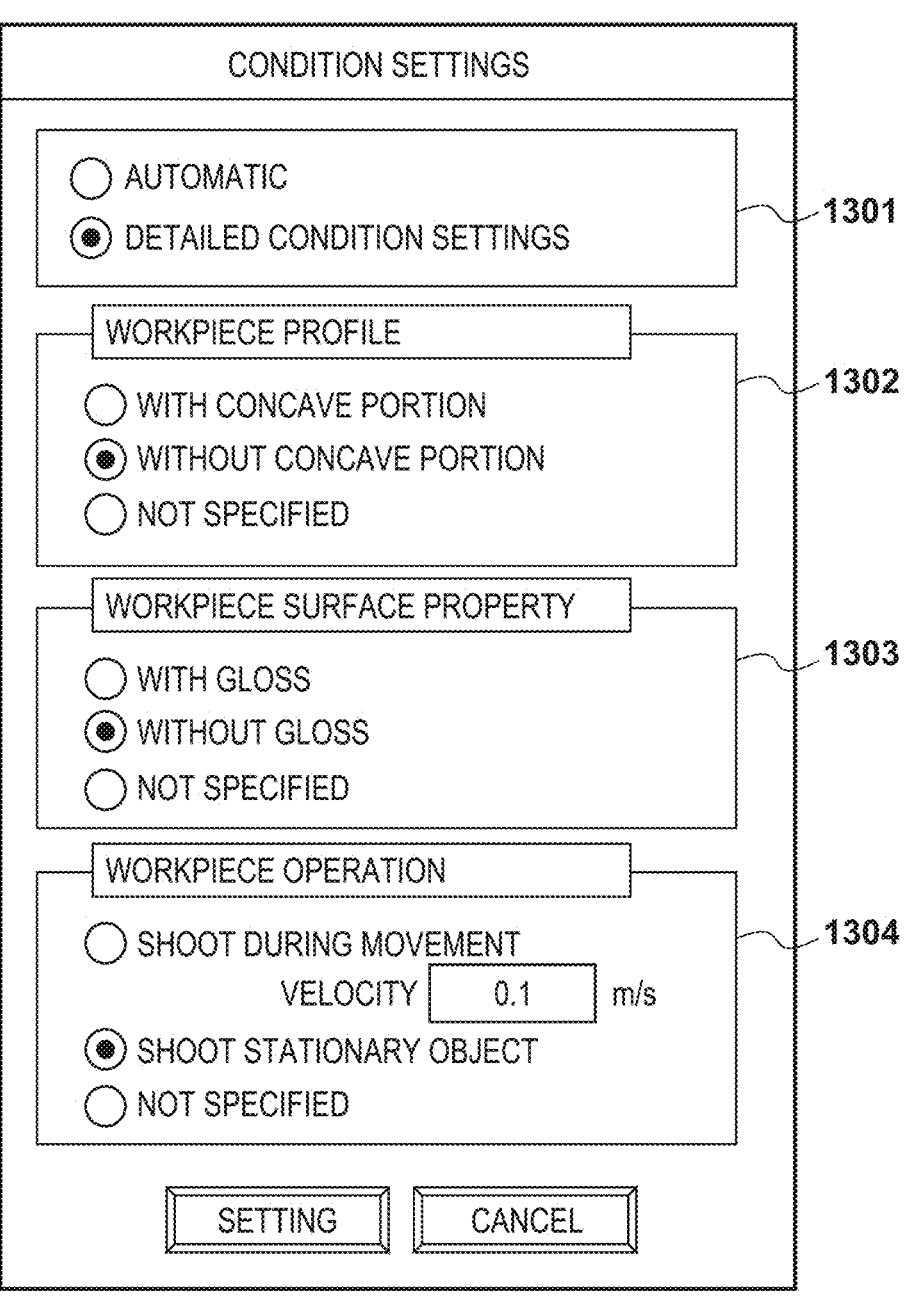

IMAGE PROCESSING APPARATUS, IMAGE PROCESSING METHOD, AND NON-TRANSITORY COMPUTER-READABLE MEDIUM

BACKGROUND OF THE INVENTION

Field of the Invention

The present invention relates to an image processing apparatus, an image processing method, and a non-transitory computer-readable medium, and particularly to an image processing technique for detecting a defect of an inspection target object.

Description of the Related Art

There is known a technique for detecting a defect on an object surface (inspection surface), based on an image of an inspection target object. Such a technique is applied to inspect the appearance of industrial products. For example, Japanese Patent Laid-Open No. 2003-240539 describes measuring a surface gradient of an inspection target object and determining the quality of the inspection target object based on the measurement result. The measurement of the surface gradient is performed based on a plurality of images captured by a camera while sequentially switching on and off each of a plurality of light sources. Specifically, there has been proposed a method of calculating a surface gradient using an illuminance difference stereo method.

SUMMARY OF THE INVENTION

According to an embodiment of the present invention, an image processing apparatus comprises one or more memories storing instructions and one or more processors that execute the instructions to: acquire a plurality of captured images acquired by shooting an inspection target object under a plurality of illumination conditions; perform a first inspection for inspecting a surface profile of the inspection target object based on a normal image indicating a normal direction of each position of the inspection target object, the normal image being generated from the plurality of captured images; and perform a second inspection for inspecting a surface profile of the inspection target object based on the plurality of captured images, the second inspection being different from the first inspection.

According to another embodiment of the present invention, an image processing method comprises: acquiring a plurality of captured images acquired by shooting an inspection target object under a plurality of illumination conditions; selecting an inspection method from a first inspection and a second inspection different from the first inspection, wherein the first inspection includes inspecting a surface profile of the inspection target object based on a normal image indicating a normal direction of each position of the inspection target object, the normal image being generated from the plurality of captured images; and the second inspection includes inspecting a surface profile of the inspection target object based on the plurality of captured images; and inspecting the surface profile of the inspection target object in accordance with the selected inspection method.

According to still another embodiment of the present invention, a non-transitory computer-readable medium stores a program executable by a computer to cause the computer to: acquire a plurality of captured images acquired by shooting an inspection target object under a plurality of illumination conditions; perform a first inspection for inspecting a surface profile of the inspection target object based on a normal image indicating a normal direction of each position of the inspection target object, the normal image being generated from the plurality of captured images; and perform a second inspection for inspecting a surface profile of the inspection target object based on the plurality of captured images, the second inspection being different from the first inspection.

Further features of the present invention will become apparent from the following description of exemplary embodiments (with reference to the attached drawings).

BRIEF DESCRIPTION OF THE DRAWINGS

FIG. 4 is a block diagram illustrating a functional configuration example of an image processing apparatus according to an embodiment.

FIG. 5 is a flowchart illustrating a flow of an image processing method according to an embodiment.

FIG. 6 is a flowchart of a process of extracting candidate regions of a surface reflection region and a shadow region.

FIGS. 8A to 8F illustrate examples of detection results of a surface reflection region and a shadow region.

FIGS. 10A to 10I illustrate examples of results of defect detection using a normal image.

FIG. 13 illustrates an example of a user interface used for inspection.

DESCRIPTION OF THE EMBODIMENTS

Figure 1:
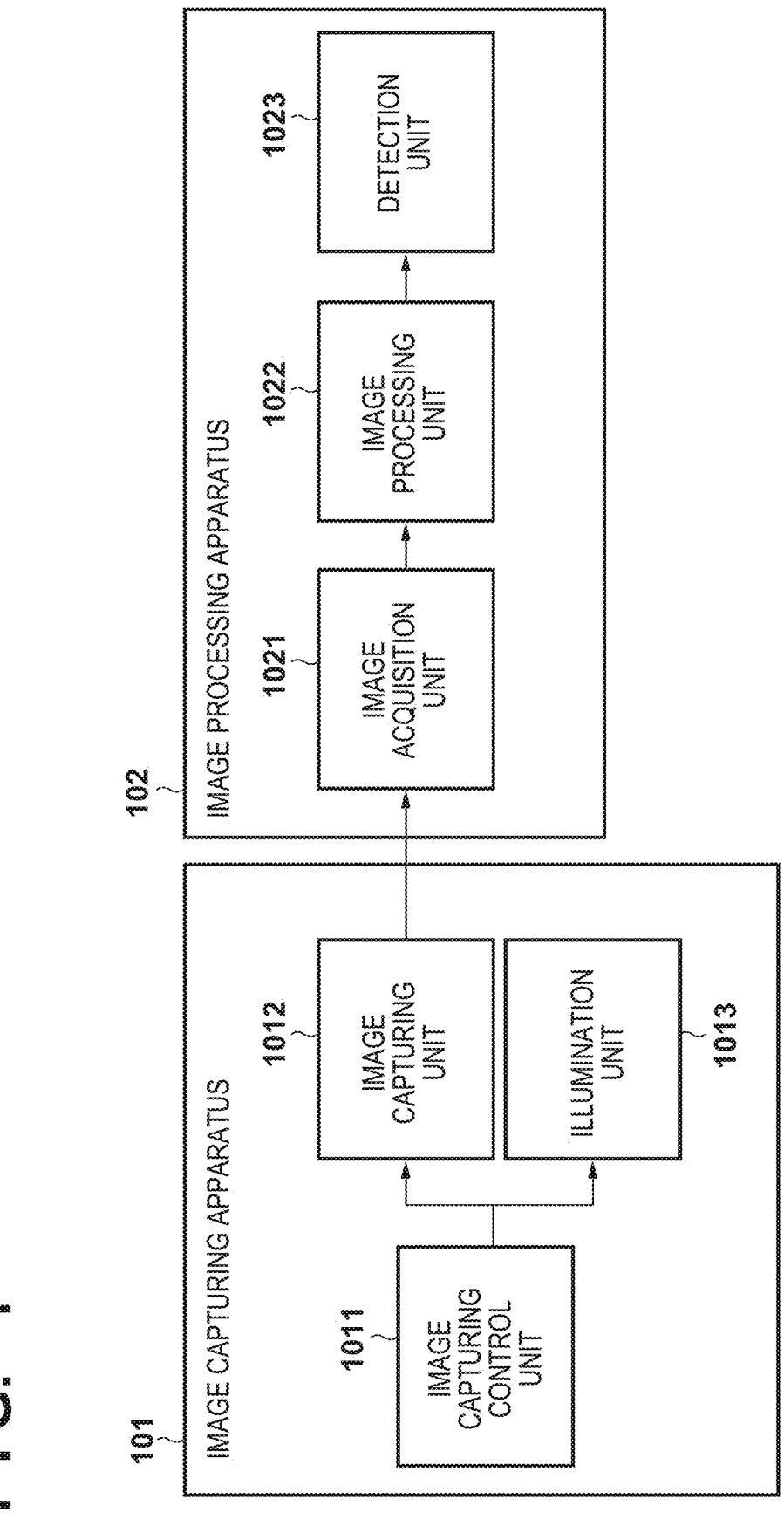
FIG. 1 is a block diagram illustrating an overall configuration example of an inspection system according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

When using the method described in Japanese Patent Laid-Open No. 2003-240539, the detection accuracy of a defect may decrease due to the shape and surface properties of an inspection target object. For example, when the inspection target object has a concave portion, a part of the inspection surface may not be irradiated with light. In such a case, a black shadow region occurs in the captured image. In addition, the illuminance difference stereo method is used on the assumption that the inspection surface is a Lambert surface. However, the inspection surface may be glossy. In such a case, a white surface reflection region may occur in the captured image due to influence of surface reflection light from a part of the inspection surface. The shadow region and the surface reflection region may reduce the estimation accuracy of the surface gradient (or normal line), in which case the detection accuracy of the defect may decrease.

An embodiment of the present invention can improve the detection accuracy of a defect in a case where an inspection target object has characteristics such as a complicated three-dimensional shape or a significant surface property, when using a technique of performing surface inspection of an inspection target object based on a captured image.

FIG. 1 is a block diagram illustrating an overall configuration of an inspection system according to an embodiment. The inspection system has an image capturing apparatus 101 and an image processing apparatus 102. The image processing apparatus 102 according to an embodiment inspects the shape of an inspection target object using a plurality of captured images of the inspection target object captured while switching illumination directions. The image capturing apparatus 101 can acquire a plurality of captured images corresponding to a plurality of illumination conditions. The image capturing apparatus 101 described in the following example acquires a plurality of captured images by shooting the inspection target object while illuminating the inspection target object from different directions at different timings.

The image capturing apparatus 101 has an image capturing control unit 1011, an image capturing unit 1012, and an illumination unit 1013. The image capturing control unit 1011 controls the image capturing timing of the image capturing unit 1012 and the light emission timing of the illumination unit 1013. The illumination unit 1013 has a plurality of light sources respectively provided at different positions. The image capturing control unit 1011 transmits, to the illumination unit 1013, a signal that causes a specific light source to emit light at an appropriate timing. The illumination unit 1013 then causes a light source specified by the signal to emit light.

The image capturing unit 1012 is a two-dimensional image capturing apparatus. The image capturing unit 1012 may be, for example, a general digital camera or a digital video camera. After having transmitted the light emission signal to the illumination unit 1013, the image capturing control unit 1011 transmits a signal instructing image capturing to the image capturing unit 1012. The image capturing unit 1012 can perform image capture in accordance with the signal. The image capturing control unit 1011 also transmits a turn-off signal to the illumination unit 1013 at a timing when the image capturing unit 1012 has completed image capturing. In response to the signal, the illumination unit 1013 turns off the light source that has been turned on. The image capturing control unit 1011 sequentially performs such an operation for each light source in accordance with preliminarily made settings. As such, the image capturing unit 1012 acquires a plurality of captured images of the inspection target object illuminated from different directions.

The image processing apparatus 102 has an image acquisition unit 1021, an image processing unit 1022, and a detection unit 1023. The image acquisition unit 1021 acquires a plurality of captured images acquired by shooting the inspection target object under a plurality of illumination conditions. The image acquisition unit 1021 can acquire such captured images from the image capturing apparatus 101. The image processing unit 1022 performs image processing using the plurality of captured images. In addition, the detection unit 1023 can inspect the inspection target object based on the result of processing by the image processing unit 1022. As such, the detection unit 1023 can detect a defect in the inspection target object. Details of the image processing unit 1022 and the detection unit 1023 will be described below.

Figures 2A, 2B, 2C:
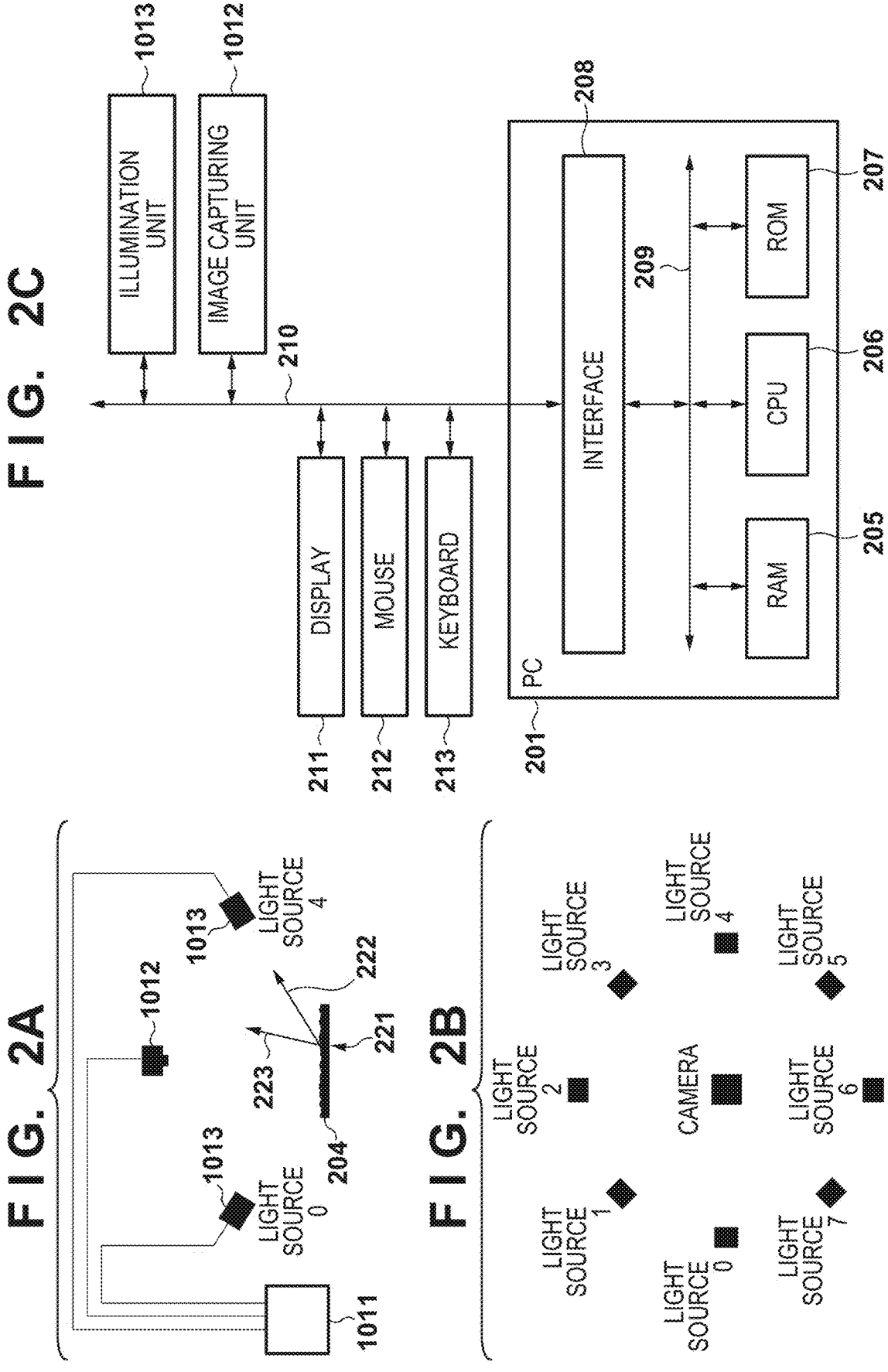
FIGS. 2A to 2C illustrate a configuration example of an image capturing apparatus and an image processing apparatus according to an embodiment.

FIGS. 2A and 2B illustrate an appearance of the image capturing apparatus 101 according to an embodiment. FIG. 2A illustrates how the illumination unit 1013 and the image capturing unit 1012 appear when seen from the side. In addition, FIG. 2B illustrates how the illumination unit 1013 and the image capturing unit 1012 appear when seen from above. The illumination unit 1013 is dome-shaped with multiple lights. The illumination unit 1013 illustrated in FIG. 2B has eight light sources (light sources 0 to 7). The image capturing unit 1012 is a camera. They are connected to the image capturing control unit 1011. The number of light sources is not limited to eight. In the present embodiment, there are three or more light sources.

As described above, the image capturing control unit 1011 individually controls the light sources 0 to 7 to irradiate the inspection surface of the inspection target object 204 with light. Illumination directions from the light sources 0 to 7 to the inspection target object 204 are different from each other. In addition, the image capturing control unit 1011 controls exposure, focus, and shooting timing of the camera serving as the image capturing unit 1012 to shoot the inspection surface being irradiated with light. For example, the image capturing apparatus 101 acquires eight captured images of the inspection surface, namely, image 0, image 1, . . . , and image 7, while individually turning on the eight light sources in the order of light source 0, light source 1, . . . , and light source 7. The image 0 is a captured image when only the light source 0 is turned on. The image 1 is a captured image when only the light source 1 is turned on.

The image processing apparatus 102 can detect a defect on the inspection surface of the inspection target object 204 using the eight captured images acquired in the aforementioned manner. Here, the image capturing control unit 1011 can be realized using a PC 201 as illustrated in FIG. 2C. In addition, also the image processing apparatus 102 can be realized using the PC 201 as illustrated in FIG. 2C. The image capturing control unit 1011 and the image processing apparatus 102 may be a same apparatus. For example, the PC 201 serving as the image processing apparatus 102 may also serve as the image capturing control unit 1011. On the other hand, the image capturing control unit 1011 and the image processing apparatus 102 may be different apparatuses.

FIG. 2C illustrates a hardware configuration example of the image processing apparatus 102 according to an embodiment. The image processing apparatus 102 can be realized by a computer including a processor and a memory. FIG. 2C illustrates a configuration of the PC 201 that can serve as the image processing apparatus 102 as described above. The PC 201 includes a RAM 205, a CPU 206, a ROM 207, and an interface 208. The components are connected by an internal bus 209.

As such, a processor such as the CPU 206 can realize the functions of respective units illustrated in FIG. 4 or the like described below by executing a program stored in a memory such as the RAM 205 or the ROM 207. For example, the process illustrated in the flowchart of FIG. 5 or the like may be stored in the ROM 207 as program codes. The program codes are loaded in the RAM 205 and executed by the CPU 206.

In addition, the PC 201 has a display 211, a mouse 212, and a keyboard 213 connected thereto by an external bus 210 via an interface 208. The display 211 presents information to the user. The mouse 212 and the keyboard 213 receive input from the user. The illumination unit 1013 and the image capturing unit 1012 described above are also connected to the PC 201 via the external bus 210.

Although the functions of the image processing apparatus 102 illustrated in FIG. 4 or the like can be realized by a computer, some or all of the functions of the image processing apparatus 102 may be realized by dedicated hardware. In addition, the image processing apparatus according to the embodiment may include a plurality of information processing apparatuses connected via a network, for example.

Figures 3A, 3B:
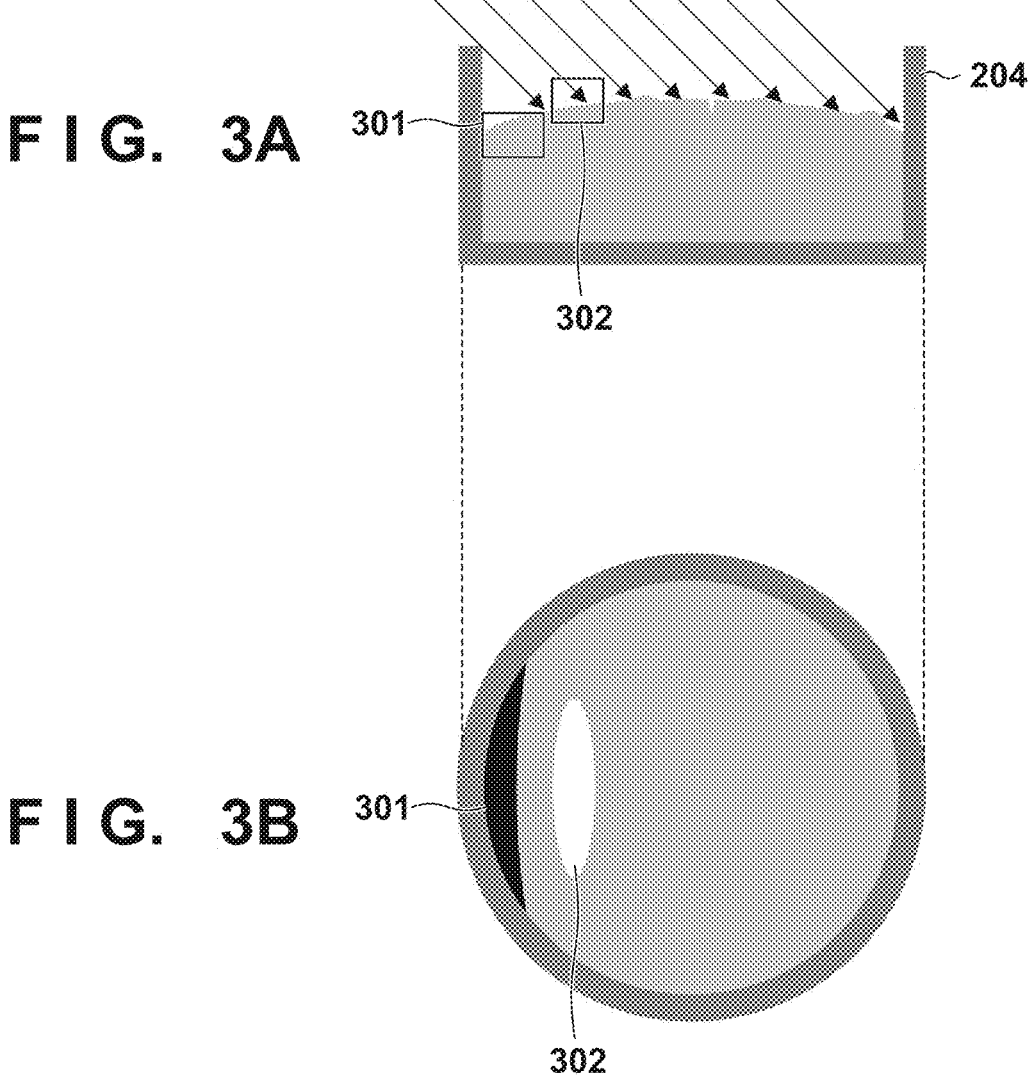
FIGS. 3A to 3B are conceptual diagrams illustrating image capture of an inspection target object.

FIGS. 3A and 3B are conceptual diagrams illustrating how the image capturing apparatus 101 illustrated in FIG. 2A shoots the inspection target object 204. FIG. 3A illustrates, as the inspection target object 204, a workpiece made by injecting resin or the like into a case. FIGS. 3A and 3B are a cross-sectional view and a top view (i.e., captured images), respectively, of the inspection target object 204. When the inspection target object 204 is irradiated with light from diagonally above, a blocked-up shadow region 301 may occur in the captured image due to lack of light irradiating the inspection surface as illustrated in FIG. 3A, depending on the shape of the case. In addition, the inspection target object 204 may be glossy. In such a case, a blown-out reflection region 302 may occur in the captured image due to influence of surface reflection light of a part of the inspection surface, depending on the angle of the light from the light source. In general, a defect can be detected with a relatively high accuracy according to a method that calculates a normal line at each position of the inspection surface and inspects the surface profile based on the normal line. On the other hand, the presence of the shadow region and the surface reflection region may reduce the estimation accuracy of the normal line of the inspection surface by the image processing apparatus 102, in which case the detection accuracy of the defect decreases.

First Embodiment

The image processing apparatus 102 according to an embodiment has a first detection unit 403 configured to perform a first inspection for inspecting the shape of an inspection target object. In addition, the image processing apparatus 102 has a second detection unit 405 configured to perform a second inspection for inspecting the shape of the inspection target object. The first inspection is performed based on a normal image indicating a normal direction (or surface gradient) at each position of the inspection target object. In addition, the second inspection is an inspection different from the first inspection.

In the following, there will be described a specific example of the first and the second inspections. In addition, there will be described an example of a method of switching between the first and the second inspections. In the present embodiment described below, a region (e.g., shadow region and surface reflection region) conforming to a predetermined condition is detected from a captured image of the inspection surface of the inspection target object. Subsequently, the first inspection based on the normal image is performed on a region that does not satisfy the aforementioned condition. In addition, the second inspection is performed on a region that satisfies the aforementioned condition. In the present embodiment, an inspection based on a reflection image generated based on a plurality of captured images is performed as the second inspection.

FIG. 4 is a block diagram illustrating a functional configuration example of the image processing apparatus 102 according to the present embodiment. As illustrated in FIG. 4, the image processing unit 1022 of the present embodiment has a processing condition determination unit 401, a normal image generation unit 402, and a reflection image generation unit 404. The detection unit 1023 has a first detection unit 403 and a second detection unit 405.

The processing condition determination unit 401 determines a first region to be subjected to the first inspection and a second region to be subjected to the second inspection, respectively, based on the captured image acquired by the image acquisition unit 1021. Here, the processing condition determination unit 401 can determine a region having predetermined characteristics on the surface of the inspection target object. In such a case, the processing condition determination unit 401 can determine a region having no predetermined characteristics as the first region and a region having predetermined characteristics as the second region. The predetermined characteristics may be those that reduce the estimation accuracy of the normal line. In addition, a region having such predetermined characteristics may include shadow regions and surface reflection regions. A region having such predetermined characteristics may be a region with a complicated three-dimensional shape (e.g., concave portion) or a special surface property (e.g., glossy surface). In the present embodiment, the processing condition determination unit 401 determines at least one of a shadow region and a surface reflection region as a region having predetermined characteristics.

The normal image generation unit 402 generates a normal image based on a plurality of captured images acquired by the image acquisition unit 1021. The normal image indicates a normal direction at each position of the inspection target object. The normal image generation unit 402 can generate a normal image for the first region. In addition, the reflection image generation unit 404 generates a composite image of a plurality of captured images acquired by the image acquisition unit 1021. For example, the reflection image generation unit 404 can generate a composite image for the second region. In the following example, the reflection image generation unit 404 generates a reflection image based on a plurality of captured images.

The first detection unit 403 performs the first inspection based on the normal image generated by the normal image generation unit 402. For example, the first detection unit 403 can detect a defect with regard to the surface profile of the inspection target object by performing a filtering process on the normal image. In addition, the second detection unit 405 performs the second inspection based on the composite image generated by the reflection image generation unit 404. Here, the second detection unit 405 inspects the surface profile of the inspection target object without using the normal image. For example, the second detection unit 405 can detect a defect with regard to the surface profile of the inspection target object by performing a filtering process on the composite image.

FIG. 5 is a flowchart illustrating a flow of the image processing method performed by the image processing apparatus 102. In the present specification, each step in the flowchart is denoted by a reference numeral starting with a letter "S". First, each step illustrated in FIG. 5 will be outlined. Details of the steps will be described below.

At S500, the image acquisition unit 1021 acquires a plurality of captured images of the inspection target object.

As described above, the plurality of captured images have been captured while switching an illumination condition. The image acquisition unit 1021 can acquire such captured images from the image capturing apparatus 101.

At S501, the processing condition determination unit 401 detects the first region and the second region as described above. For example, the processing condition determination unit 401 can detect a shadow region and a surface reflection region using the group of captured images acquired at S500. As has been already described, the first inspection is performed on the first region, and the second inspection is performed on the second region. In other words, the processing at S501 corresponds to selecting, for each position of the inspection surface, an inspection method to be used for inspecting the surface profile from the first and the second inspections.

At S502, the normal image generation unit 402 generates a normal image. The normal image generation unit 402 can generate a normal image for the first region. At S503, the first detection unit 403 performs the first inspection based on the normal image generated at S502. As such, the first detection unit 403 can inspect for any defect on the inspection surface.

At S504, the reflection image generation unit 404 generates reflection images of a plurality of captured images. For example, the reflection image generation unit 404 can generate a reflection image for the second region. Next, at S505, the second detection unit 405 performs the second inspection based on the reflection image generated at S504. As such, the second detection unit 405 can inspect for any defect on the inspection surface.

In the following, there will be described details of the detection process of a shadow region and a surface reflection region performed at S501. The processing condition determination unit 401 can detect the second region based on pixel values of respective pixels in the captured image. For example, the processing condition determination unit 401 can determine a region having pixel values included in a predetermined range within the captured image. The processing condition determination unit 401 can determine such a region as the second region. In particular, the processing condition determination unit 401 can determine, as the second region, a region having a size equal to or larger than a predetermined area among such regions. As a specific example, the processing condition determination unit 401 can detect a pixel brighter or darker than a threshold value, and can detect the second region based on the result of detection of such a pixel. Additionally, in the present example, the first region refers to a region other than the second region. In an embodiment, the image capturing apparatus 101 acquires a color captured image. In such a case, the following process can be performed using a gray scale image acquired by image processing performed on the captured image. For example, Img (k) described below may be a luminance image acquired based on the color captured image and indicating a luminance value of each pixel.

At S501, a candidate region for the second region is first detected. FIG. 6 illustrates a flowchart of the process. According to the process illustrated in FIG. 6, pixels having pixel values equal to or larger than a preliminarily set first threshold value Th1 are extracted as a candidate region of the surface reflection region. In addition, pixels having pixel values equal to or smaller than a preliminarily set second threshold value Th2 are extracted as a candidate region of the shadow region. That is, in the present example, a region having pixel values equal to or larger than Th1 or Th2 is extracted as a candidate region. Here, the pixel values of the pixels in the candidate region of the second region (and the second region detected according to FIG. 7) in at least one of the plurality of captured images are included in a predetermined range (equal to or larger than Th1 or Th2 in the present example).

At S601, the processing condition determination unit 401 generates a binary image Img_buf having as many vertical and horizontal pixels as the captured image, of which all the pixels have a pixel value "0". In the present embodiment, the plurality of captured images have a same number of vertical and horizontal pixels. At S602, the processing condition determination unit 401 sets the initial value of k to "0".

At S603, the processing condition determination unit 401 acquires and stores Img (k) in the memory. Img (k) is a captured image acquired at S500. At S500, eight images Img (0) to Img (7) are acquired. At S604, the processing condition determination unit 401 sets the initial values of the horizontal-direction pixel position i and the vertical-direction pixel position j to "0", respectively.

At S605, the processing condition determination unit 401 determines whether or not the pixel value P(i, j) of Img (k) is equal to or larger than a preliminarily set first threshold value Th1 or equal to or smaller than a preliminarily set second threshold value Th2. In other words, the processing condition determination unit 401 determines whether or not the pixel (i, j) of Img (k) is included in either the candidate region of the surface reflection region (P(i, j)≥Th1) or the candidate region of the shadow region (P(i, j)≤Th2). When neither condition is satisfied, the process proceeds to S606. When either condition P(i, j)≥Th1 or P(i, j)≤Th2 is satisfied, the pixel (i, j) is included in the candidate region of the reflection region or the shadow region. On this occasion, the process proceeds to S607. At S607, the processing condition determination unit 401 updates the value of Img_buf (i, j) to "1", and subsequently the process proceeds to S606.

At S606, the processing condition determination unit 401 determines whether or not the processing at S605 has been completed for all the values of i. When the processing has not been completed, i is incremented at S609 and subsequently the process returns to S605. When the process has been completed, the process proceeds to S608. At S608, i is initialized to "0" and subsequently the process proceeds to S610.

At S610, the processing condition determination unit 401 determines whether or not the processing at S605 has been completed for all the values of j. When the processing has not been completed, j is incremented at S612 and subsequently the process returns to S605. When the process has been completed, the process proceeds to S611. In Img_buf, on this occasion, the pixel values in the candidate regions of the surface reflection region and the shadow region detected from the image of Img (k) have been updated to "1". At S611, j is initialized to "0" and subsequently the process proceeds to S613.

At S613, the processing condition determination unit 401 determines whether or not the process has been completed for all the values of k. When the process has not been completed, k is incremented at S614 and subsequently the process returns to S603. When the process has been completed, the process illustrated in FIG. 6 is terminated. On this occasion, the pixel values in the candidate regions of the surface reflection region and the shadow region detected in at least one of the captured images in Img_buf are updated to "1".

Figure 7:
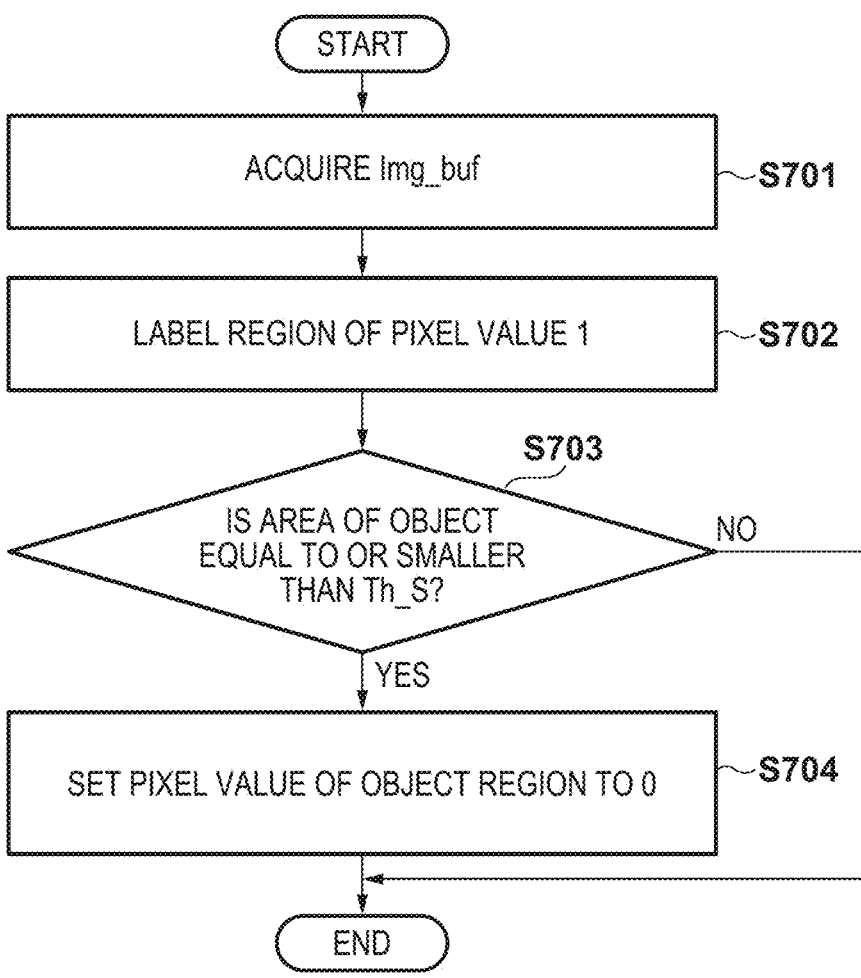
FIG. 7 is a flowchart of a process of determining a surface reflection region and a shadow region.
Figures 9A, 9B, 9C, 9D:
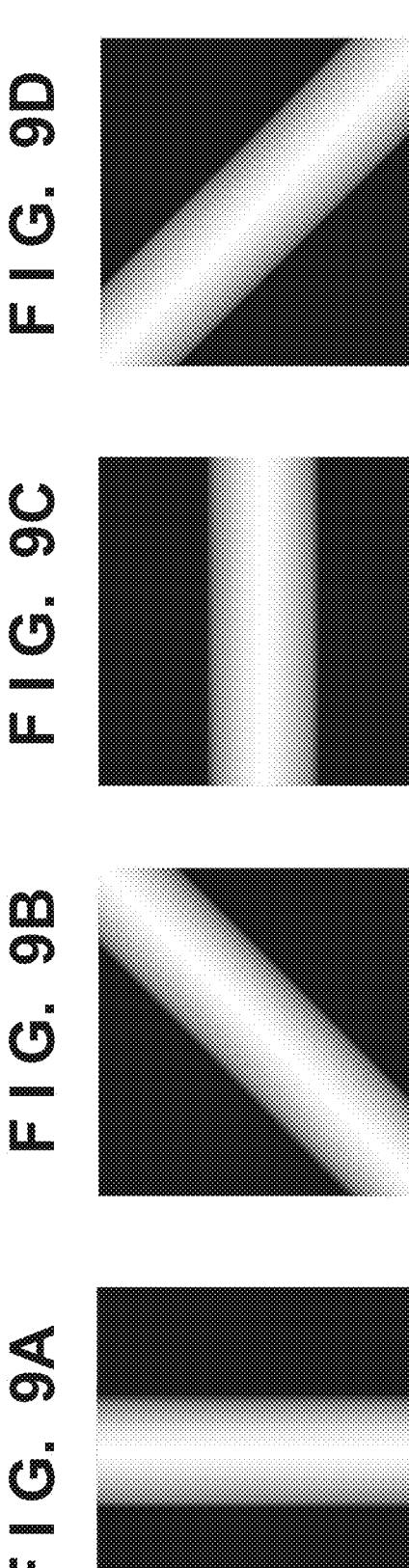
FIGS. 9A to 9D illustrate examples of filters to be used for inspection.

Next, a region having a predetermined size among the candidate regions of the second region is detected as the second region. FIG. 7 illustrates an example flowchart of the process. According to the process illustrated in FIG. 7, a region with an area equal to or smaller than a preliminarily set threshold value Th_S is excluded from the candidate regions of the surface reflection region and the shadow region.

At S701, the processing condition determination unit 401 inputs, to the memory, the binary image Img_buf acquired by the process according to FIG. 6. At S702, the processing condition determination unit 401 labels a region having a pixel value "1" in Img_buf. For example, the processing condition determination unit 401 searches for pixels having a pixel value "1" from the binary image and assigns a label number to the pixel. When there is another pixel having the pixel value "1" nearby the pixel thus found, the processing condition determination unit 401 assigns the same label number to the other pixel. As such, a group of pixels adjacent to each other and having a pixel value "1" is recognized as a single object.

At S703, the processing condition determination unit 401 determines whether or not the area of each object labeled at S702 is equal to or smaller than a preliminarily set threshold value Th_S. The area of an object can be represented by the number of pixels having a same label number assigned thereto. The processing condition determination unit 401 then sets a pixel value "0" to each pixel included in an object whose area is equal to or smaller than Th_S in Img_buf. In other words, such pixels are excluded from the candidate regions of the surface reflection region and the shadow region. Process steps S703 and S704 are performed for each object.

FIGS. 8A to 8F are conceptual diagrams illustrating results of processing according to the flowcharts of FIGS. 6 and 7. FIG. 8A illustrates the images 0 to 7 captured by the image capturing unit 1012. Each of the images 0 to 7 has been captured while being illuminated by the light sources 0 to 7 from different angles. The inspection target object is as illustrated in FIG. 3A. FIG. 8A illustrates a shadow region 811 in black and the surface reflection region 812 in white. In addition, there exists a defect 813 on the inspection surface as illustrated in FIG. 8A. With the inspection target object being illuminated from different directions in respective captured images, the shadow region and the surface reflection region generated thereby are different for each captured image.

FIG. 8B illustrates Img_buf acquired by the process according to the flowchart of FIG. 6. FIG. 8B illustrates pixels having the pixel value "0" in black and pixels having the pixel values "1" in white. That is, in any of the images 0 to 7, pixels whose pixel value is equal to or larger than the first threshold value Th1, or equal to or smaller than the second threshold value Th2, are indicated in white as a candidate region of the surface reflection region or the shadow region.

FIG. 8C illustrates Img_buf acquired by the process according to the flowchart of FIG. 7. In comparison with the white region illustrated in FIG. 8B, white regions having a smaller area than the threshold value Th_S are excluded. The white region illustrated in FIG. 8C is a reflection region or a shadow region.

Furthermore, an inspection region to be inspected may be set in the captured image. FIG. 8D illustrates an example of an inspection region. In FIG. 8D, the inspection region is indicated as a white region. The processing condition determination unit 401 may extract a region included in the inspection region from the region determined to be neither the shadow region nor the surface reflection region illustrated in FIG. 8C (black region in FIG. 8C). The first inspection is performed on the region extracted in the aforementioned manner. The first detection unit 403, which will be described below, can generate a normal image for this region. In addition, the processing condition determination unit 401 may extract a region included in the inspection region from the region determined to be a shadow region or a surface reflection region illustrated in FIG. 8C (white region in FIG. 8C). For example, the processing condition determination unit 401 can generate an image indicating a logical product between each pixel of Img_buf illustrated in FIG. 8C and each pixel of an image indicating the inspection region illustrated in FIG. 8D. The second inspection is performed on the region thus extracted (region having the pixel value "1" in the image indicating the logical product). The reflection image generation unit 404, which will be described below, can generate a reflection image for this region.

Next, there will be described a generation process of a normal image at step S502. The normal image generation unit 402 can generate a normal image for a region determined to be neither a shadow region nor a surface reflection region. The normal image generation unit 402 generates a normal image indicating a normal direction at each position of the inspection target object, based on the plurality of captured images. The normal image generation unit 402 can generate a normal image using an illuminance difference stereo method. In the following example, there will be described a case where the normal image generation unit 402 generates a normal image based on eight captured images.

The illuminance difference stereo method assumes that the reflection luminance of the inspection surface is proportional to the inner product of the vector indicating the direction of the light source and the normal vector. In other words, it is assumed that formula (1) holds at each position (x, y) on the inspection surface. It is assumed in the following description that the inspection surface is an x-y plane including the x-axis and the y-axis. In addition, a direction perpendicular to the inspection surface is defined to be the z-axis. Although the inspection surface may have a concave portion as described above, it is approximated to a flat surface in the present example. In the following example, the position (x, y) on the inspection surface corresponds to a pixel (x, y) in the captured image.

However, each position on the inspection surface may be represented by three-dimensional coordinates. It is also possible to calculate a light source matrix L as follows, based on a light source vector preliminarily measured for each position on the inspection surface. In addition, it is also possible to preliminarily acquire the relation between each position on the inspection surface and each position on the captured image. Based on the aforementioned positional relation, the luminance vector I can be calculated as follows.

$$I_i = L_i N_\rho = \begin{bmatrix} L_{ix} & L_{iy} & L_{iz} \end{bmatrix} \begin{bmatrix} \rho N_x \\ \rho N_y \\ \rho N_z \end{bmatrix} \tag{1}$$

In formula (1), $I_i$ represents the reflection luminance at a position (x, y) when only the light source i is turned on (i is an integer from 0 to 7). The reflection luminance $I_i$ can be acquired from the image i. $L_i = [L_{ix} \ L_{iy} \ L_{iz}]$ denotes a unit vector indicating the orientation of the light source i at a position (x, y). In the following, $L_i$ is referred to as a light source vector. FIG. 2A illustrates a light source vector 222 indicating the direction of the light source 4 at a position 221 on the inspection surface. $N_\rho = [\rho N_x \; \rho N_y \; \rho N_z]^T$ indicates a pseudo normal vector acquired by multiplying a proportionality constant $\rho$ to a normal vector at a position (x, y). Here, T represents transposition of a vector. The normal vector N is a unit vector, and the proportionality constant $\rho$ indicates the albedo (reflectance) at the position (x, y). FIG. 2A also illustrates a normal vector 223 at a position 221 on the inspection surface.

Formula (1) holds for each of the light sources 0 to 7. Summarizing the foregoing relations results in formula (2). In addition, with I denoting the vector on the left side of formula (2) and L denoting the eight-row, three-column matrix on the right side, formula (3) is acquired. in the following, I is referred to as a luminance vector, and L is referred to as a light source matrix.

$$\begin{bmatrix} I_0 \\ I_1 \\ \vdots \\ I_7 \end{bmatrix} = \begin{bmatrix} L_{0x} & L_{0y} & L_{0z} \\ L_{1x} & L_{1y} & L_{1z} \\ \vdots & \vdots & \vdots \\ L_{7x} & L_{7y} & L_{7z} \end{bmatrix} \begin{bmatrix} \rho N_x \\ \rho N_y \\ \rho N_z \end{bmatrix} \tag{2}$$

$$I = LN_\rho \tag{3}$$

The luminance vector I indicated in formula (3) can be acquired from eight captured images. The light source matrix L can be acquired by a preliminary measurement. Therefore, it can be said that formula (3) is a simultaneous equation having the three components of the pseudo normal vector Np as unknown variables. When there are three light sources, the light source matrix L is a three-row, three-column square matrix. When L is a regular matrix, an inverse matrix $L^{-1}$ of L can be acquired. Applying the $L^{-1}$ to the luminance vector I provides a solution of formula (3).

When, on the other hand, there are four or more light sources, formula (3) are a simultaneous formula in an over-determined system. In such a case, a least square solution of formula (3) can be acquired by applying the pseudo inverse matrix $(L^T L)^{-1} L^T$ of the light source matrix L to the luminance vector I, as illustrated in formula (4).

$$N_\rho = (L^T L)^{-1} L^T I \tag{4}$$

$$\rho = |N_\rho| \tag{5}$$

$$N = (1/\rho) N_\rho \tag{6}$$

On this occasion, the albedo $\rho$, which corresponds to the length of the pseudo normal vector $N_\rho$, is calculated by formula (5). The normal vector N, which is a unit vector calculated by normalizing the length of the pseudo normal vector $N_\rho$ to 1, is calculated by formula (6).

Performing the calculation according to formulae (4) to (6) described above for each position (x, y) results in a normal image indicating the spatial distribution of the normal vector N on the inspection surface. Here, an albedo map (reflectance map) indicating the spatial distribution of albedo on the inspection surface can also be acquired by formula (5).

FIG. 8E illustrates an example of a normal image generated in the aforementioned manner. In the normal image illustrated in FIG. 8E, the darker the color, the closer the normal line is to the vertical direction, and the lighter the color, the farther the normal line is from the vertical direction. The region indicated in white in FIG. 8E is not to be used for generating a normal image.

Next, a first inspection process at S503 will be described. The first detection unit 403 performs the first inspection on a region determined to be neither a shadow region nor a surface reflection region. A defect detection method to be performed by the first detection unit 403 will be described, referring to FIGS. 9A to 9D and FIGS. 10A to 10I.

FIGS. 9A to 9D illustrate an example of a detection filter to be used in the first inspection. In the present embodiment, four filters in a direction orthogonal to each light source direction are used as detection filters. The reason for using such a filter is for the purpose of accurately calculating the normal image with regard to an uneven defect on the inspection surface when the defect is orthogonal to the light source direction. Using these filters allows for detecting a continuous region in the filter direction, in which the normal direction is disturbed.

The first detection unit 403 performs a filtering process on each of a two-dimensional distribution of Nx representing the x component of the normal vector N, and a two-dimensional distribution of Ny representing the y component of the normal vector N, illustrated in the normal image, using each of the detection filters illustrated in FIGS. 9A to 9D. FIGS. 10A to 10D illustrate mean values of the results of filtering processes performed on Nx and Ny for each pixel. FIGS. 10A to 10D respectively correspond to respective filters illustrated in FIGS. 9A to 9D.

FIGS. 10E to 10H illustrate results of excluding, from FIGS. 10A to 10D, a region other than the first region which is the target of the first inspection (i.e., setting the pixel value in that region to 0). As described above, the shadow region and the surface reflection region excluded from the target of the first inspection are illustrated as white regions in FIG. 8C. Here, the boundary between the shadow region and the surface reflection region combined, and regions other than those may be further excluded from the target of the first inspection. In such a case, the white region in FIG. 8C can be expanded by performing morphology conversion or the like. Such a region corresponding to the expanded white region may be excluded from detection results such as those illustrated in FIGS. 10A to 10D.

From the detection results illustrated in FIGS. 10E to 10I, the detection results illustrated in FIG. 10H can be acquired. Each pixel of the detection result illustrated in FIG. 10I indicates the maximum value of each pixel of the detection results illustrated in FIGS. 10E to 10H. FIG. 10I illustrates the detection result in the first inspection. In other words, pixels of a defective region detected in the target region of the first inspection have different pixel values from those of other regions. As such, the image illustrated in FIG. 10I indicates a distribution of the defect detected by the second inspection.

Next, there will be described a process of generating a reflection image at step S504. The reflection image generation unit 404 generates a reflection image for a region determined to be a shadow region or a surface reflection region. In the following example, there will be described a case in which the reflection image generation unit 404 generates a reflection image based on eight captured images. The reflection image can be acquired by combining a plurality of captured images. In the present embodiment, each pixel of the reflection image generated by the reflection image generation unit 404 has the maximum value of pixel values of corresponding pixels in the eight captured images. For example, the reflection image generation unit 404 can compare pixel values of pixels at a same location in the eight captured images. The reflection image generation unit 404 then can use the maximum value of the pixel values of for eight captured images as the pixel value of the pixel at the same position in the reflection image. FIG. 8F illustrates an example of a reflection image thus generated. FIG. 8F indicates that the darker the color is, the lower the reflection brightness. A region indicated by white in FIG. 8F is not a region from which a reflection image is to be generated.

In an embodiment, the image capturing apparatus 101 acquires a color captured image. In such a case, the reflection image generation unit 404 can generate a reflection image for each plane (e.g., R, G and B). Generally, however, presence of a defect is rarely indicated by only one of the R, G or B planes. Therefore, a reflection image may be generated based only on the G component, and the second inspection may be performed based on the reflection image. As another example, a reflection image may be generated based on an image in another color space (e.g., XYZ or L*a*b*), and the second inspection may be performed based on the reflection image. Furthermore, a reflection image may be generated based only on the Y component or the L* component, and the second inspection may be performed based on the reflection image.

Next, a second inspection process at S505 will be described. The second detection unit 405 performs the second inspection on the region determined to be a shadow region or a surface reflection region. A method of detecting a defect by the second detection unit 405 will be described, referring to FIGS. 9A to 9D and FIGS. 11A to 11I.

In the present embodiment, the second detection unit 405 inspects the surface profile of the inspection target object based on the reflection image generated at S504. In addition, the second detection unit 405 can detect a defect with regard to the surface profile of the inspection target object by performing a filtering process on the reflection image. The second detection unit 405 can also use the detection filters illustrated in FIGS. 9A to 9D, similarly to the first detection unit 403. This is because the pixel value at the position of the defect in the captured image increases when an uneven defect on the inspection surface is orthogonal to the light source direction, similarly to the normal image, whereby a defect can be easily detected. However, the normal image used for detection by the first detection unit 403 and the reflection image used for detection by the second detection unit 405 represent different physical characteristics, respectively. Therefore, the profiles of the filters used by the first detection unit 403 and the second detection unit 405 need not be identical. For example, respective filters may be adjusted so that the first detection unit 403 and the second detection unit 405 can perform appropriate detection processing.

The second detection unit 405 can perform a filtering process using the detection filters illustrated in FIGS. 9A to 9D on each of the two-dimensional distributions of the R, G, and B components indicated by the reflection image generated at S504. FIGS. 11A to 11D illustrate results of the filtering process performed on the reflection image illustrated in FIG. 8F. FIGS. 11A to 11D illustrate mean values, for each pixel, of the results of the filtering process performed on the R, G, and B components of the reflection image. FIGS. 11A to 11D correspond to the filters illustrated in FIGS. 9A to 9D, respectively.

FIGS. 11E to 11H illustrate results of excluding, from FIGS. 11A to 11D, a region other than the second region which is the target of the second inspection (i.e., setting the pixel value in the region to 0). As described above, shadow regions and surface reflection regions to be subjected to the second inspection are illustrated as white regions in FIG. 8C. Here, the boundary between the shadow region and the surface reflection region combined, and regions other than those may be further excluded from the target of the second inspection. In such a case, the black region in FIG. 8C can be expanded by performing morphology conversion or the like. Such a region corresponding to the expanded black region may be excluded from detection results such as those illustrated in FIGS. 11A to 11D.

Figures 11A, 11B, 11C, 11D, 11E, 11F, 11G, 11H, 11I:
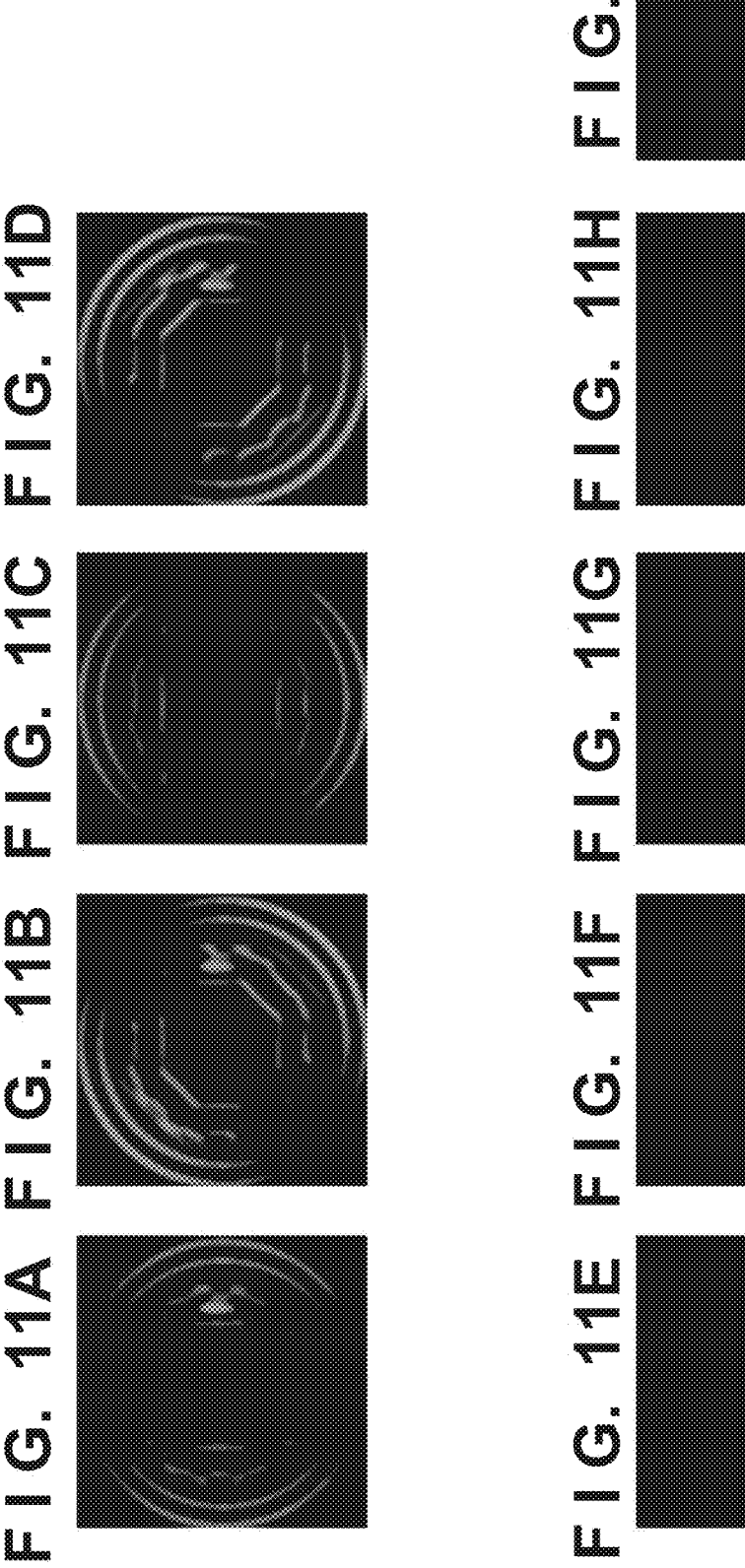
FIGS. 11A to 11I illustrate examples of results of defect detection using a reflection image.

The detection result illustrated in FIG. 11H can be acquired from the detection results illustrated in FIGS. 11E to 11I. Each pixel of the detection result illustrated in FIG. 11I indicates the maximum value of each pixel of the detection results illustrated in FIGS. 11E to 11H. FIG. 11I illustrates the detection result of the second inspection. In other words, the pixel of the defective region detected in the target region of the second inspection has a pixel value different from other regions. As such, the image illustrated in FIG. 11I indicates the distribution of the defects detected by the second inspection.

As described above, the first detection unit 403 can output the result of the first inspection in the first region (a region other than the shadow region and the surface reflection region. in the present example). In addition, the second detection unit 405 can output the result of the second inspection in the second region (the shadow region and the surface reflection region, in the present example). The detection unit 1023 may have an output unit (not illustrated) configured to output these pieces of information. In addition, the output unit may combine the results of the first and the second inspections, and output the combined result. For example, the output unit may combine an image (e.g., FIG. 10I) indicating a defect detected in the first region and an image (e.g., FIG. 11I) indicating a defect detected in the second region, and output the composite image.

According to the present embodiment as described above, the image processing apparatus can perform both the first inspection based on the normal image and the second inspection which is different from the first inspection, in order to inspect the surface profile of the inspection target object. Therefore, it is possible to improve the inspection accuracy when the surface of the inspection target object has characteristics that reduces the estimation accuracy of the normal line. For example, an inspection based on a reflection image is performed on the shadow region and the surface reflection region, whereas an inspection based on a normal image is performed on other regions. Therefore, a defect can be detected in both the shadow region or the surface reflection region, and other regions. In particular, it is expected according to the aforementioned method that the inspection accuracy improves by performing the first inspection based on the normal image as compared with the case of performing the second inspection, in a region other than the shadow region and the surface reflection region. On the other hand, it is expected that the inspection accuracy improves by performing the second inspection as compared with the case of performing the first inspection in the shadow region and the surface reflection region.

Second Embodiment

In the following, there will be described a method of switching between the first and the second inspections, and another example of the second inspection. In the second embodiment, when neither a shadow region nor a surface reflection region has been detected from the inspection surface, the first inspection is performed based on the normal image. When, on the other hand, a shadow region or a surface reflection region has been detected from the inspection surface, the second inspection is performed without generating a normal image. In addition, the second embodiment performs the second inspection based on the filtering process on the captured image group, instead of performing the second inspection based on the reflection image. In the following, description will be provided focusing on the difference from the first embodiment.

Figure 12:
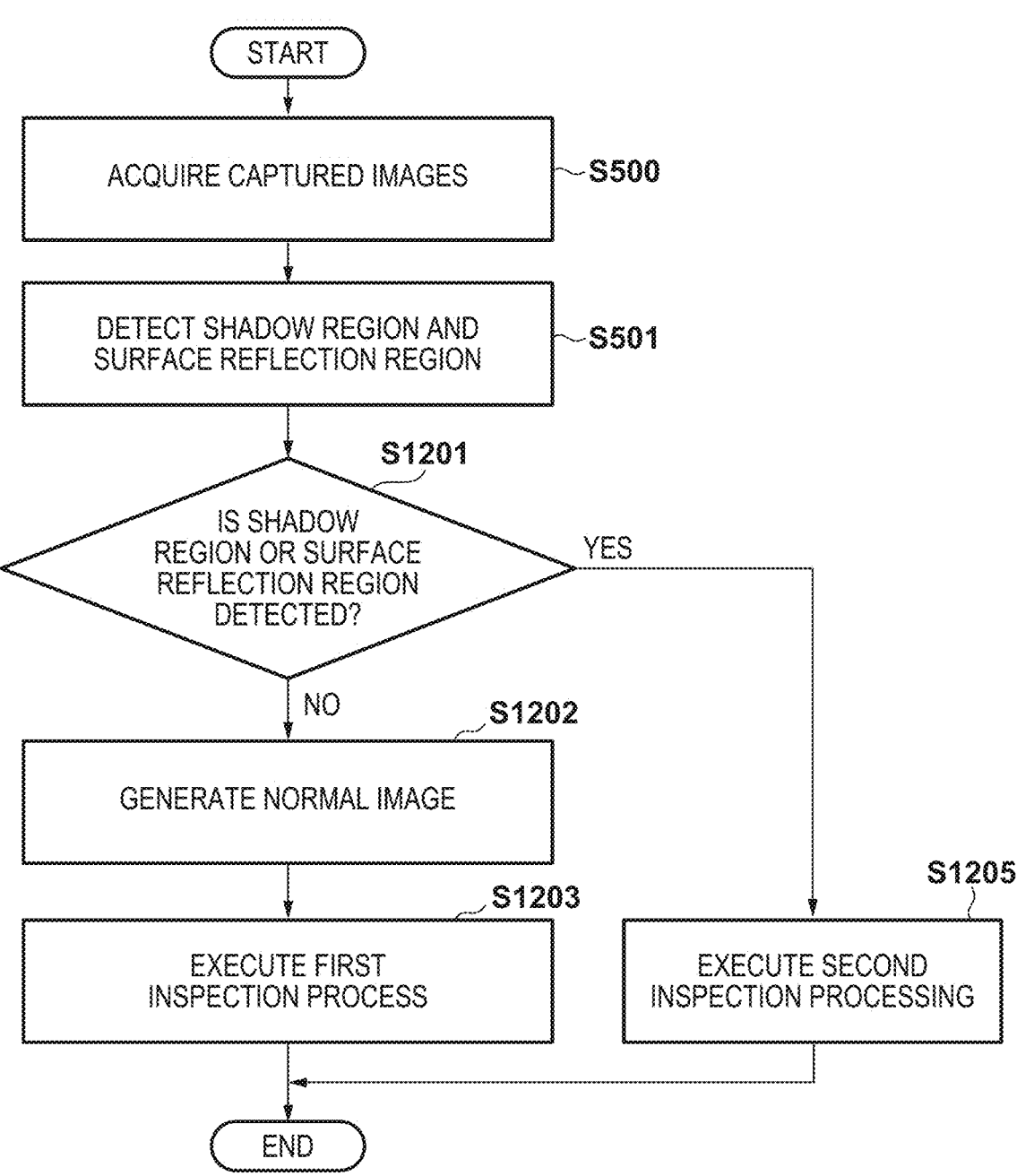
FIG. 12 is a flowchart illustrating a flow of an image processing method according to an embodiment.

FIG. 12 is a flowchart illustrating the flow of the image processing method to be performed by the image processing apparatus 102. Steps S500 and S501 are performed similarly to the first embodiment.

At S1201, the processing condition determination unit 401 determines which of the first or the second inspections is to be performed. In other words, at S1201, the inspection method to be used for inspecting the surface profile of the inspection target object is selected from the first or the second inspections. The processing condition determination unit 401 determines to perform the first inspection from S1202 to S1203 when no region having predetermined characteristics has been detected from the surface of the inspection target object. When, on the other hand, a region having the predetermined characteristics has been detected from the surface of the inspection target object, the processing condition determination unit 401 determines to perform the second inspection at S1205. Also in the present embodiment, the region having the predetermined characteristics may be at least one of a shadow region and a surface reflection region.

In the case of the present embodiment, the processing condition determination unit 401 first determines whether or not a shadow region or a surface reflection region has been detected at S501. For example, the processing condition determination unit 401 can generate an image indicating a logical product between each pixel of Img_buf illustrated in FIG. 8C and each pixel of an image indicating the inspection region illustrated in FIG. 8D. Subsequently, when the aforementioned image has a region having a pixel value "1" (i.e., a shadow region or a surface reflection region in the inspection region), the processing condition determination unit 401 can determine that a shadow region or a surface reflection region has been detected from the inspection surface. In addition, when the pixel values of the entire image are all "0", the processing condition determination unit 401 can determine that neither a shadow region nor a surface reflection region has been detected from the inspection surface. When neither a shadow region nor a surface reflection region has been detected, the process proceeds to S1202. When a shadow region or surface reflection region has been detected, the process proceeds to S1205.

At S1202, the normal image generation unit 402 generates a normal image similarly to S502. At S1203, the first detection unit 403 performs the first inspection based on the normal image similarly to S503. As such, the first detection unit 403 can perform the first inspection when no region having the predetermined characteristics has been detected on the surface of the inspection target object.

At S1205, the second detection unit 405 performs the second inspection. As described above, the second detection unit 405 can perform the second inspection in response to the fact that a region having the predetermined characteristics has been detected from the surface of the inspection target object. In the present embodiment, the second detection unit 405 inspects the surface profile of the inspection target object based on each of the plurality of captured images without using the normal image. As described above, the group of captured images itself acquired by the image acquisition unit 1021 is used in the second inspection according to the present embodiment. In addition, the second detection unit 405 can detect a defect with regard to the surface profile of the inspection target object by performing a filtering process on each of the plurality of captured images. The present embodiment does not use a similar reflection image to that of the first embodiment. In the present embodiment, therefore, the image processing unit 1022 need not have the reflection image generation unit 404.

Specifically, the second detection unit 405 can perform a filtering process on each of the eight captured images using any one of the filters illustrated in FIGS. 9A to 9D. As described above, a defect extending in the direction orthogonal to the direction of the light source is outstanding in the captured image. The present embodiment therefore applies a filter orthogonal to the light source direction on each captured image, instead of applying all types of filters to all the captured images. Such a method allows for processing with increased speed. For example, only the filter illustrated in FIG. 9A can be applied to an image 0, which is a captured image of the inspection surface being illuminated by a light source 0 located on the left side. In addition, only the filter illustrated in FIG. 9B can be applied to an image 1, which is the captured image of the inspection surface being illuminated by a light source 1 located diagonally left upward.

In addition, it is possible to generate a result of detection by the second processing, based on the result of the filtering process on each of such eight captured images. Similarly to the first embodiment, the detection result may be a two-dimensional image indicating the maximum value of each pixel in the results of the eight filtering processes. The image thus acquired indicates a distribution of defects detected by the second inspection. In addition, the inspection region can be limited by using the mask image illustrated in FIG. 8D, similarly to the first embodiment. As such, it is possible to detect only the defects present on the detection surface.

According to the present embodiment as described above, the image processing apparatus can perform both the first inspection based on the normal image and the second inspection which is different from the first inspection, in order to inspect the surface profile of the inspection target object. Therefore, it is possible to perform appropriate inspection in both cases where the surface of the inspection target object has characteristics that may reduce the estimation accuracy of the normal line, and where the surface of the inspection target object does not have such characteristics. For example, inspection is performed based on the captured image when the inspection target object has a shadow region or a surface reflection region, otherwise, when the inspection target object does not have those regions, inspection is performed based on the normal image. Therefore, it is possible to perform appropriate inspection on both the inspection target object having a shadow region or a surface reflection region, and the inspection target object not having those regions.

Third Embodiment

In the following, there will be described another example of the method of switching between the first and the second inspections. The present embodiment selects the first or the second inspection in accordance with the user input. In the following, description will be provided focusing on the difference from the second embodiment.

FIG. 13 illustrates a user interface to be used for user input. The user interface may be used by a user to input information related to the inspection target object. The processing condition determination unit 401 can display such a user interface on a display device such as the display 211. In addition, the processing condition determination unit 401 can acquire, via the mouse 212 or the keyboard 213, a user input performed on the user interface.

A toggle button 1301 is used for setting detailed conditions. A toggle button 1302 is used for setting whether or not there exists a concave portion on the inspection surface of the inspection target object (workpiece). A toggle button 1303 is used for setting whether or not the inspection surface of the workpiece is glossy. A toggle button 1304 is used for setting the movement of the workpiece. The user can provide an input to indicate that the workpiece being shot is either moving or stationary. For example, the inspection target object may be shot while being conveyed on a belt conveyor or the like. Upon selecting "shoot during movement", the user can further input the moving speed of the workpiece in the text box.

As such, the user can set inspection-related conditions such as information related to the inspection target object. As illustrated in FIG. 13, the information related to the inspection target object can indicate at least one of shape characteristics (e.g., presence or absence of a concave portion) of the inspection target object and a surface property (e.g., presence or absence of gloss) of the inspection target object. In addition, the information related to the inspection target object can indicate at least one of: whether or not the inspection target object is moving; and the moving speed of the inspection target object.

The processing condition determination unit 401 then can determine which of the first or the second inspections is to be performed in accordance with information related to the inspection target object which has been set by the user. For example, the processing condition determination unit 401 can select the second inspection when there is a possibility that the inspection surface may include a shadow region or a surface reflection region. The processing condition determination unit 401 can determine that there is a possibility that the inspection surface has a shadow region or a surface reflection region when the inspection surface has a concave portion or is glossy. In the example of FIG. 13, the processing condition determination unit 401 can select the second inspection when "with concave portion" is selected with the toggle button 1302 or when "with gloss" is selected with the toggle button 1303. As described above, the processing condition determination unit 401 can determine to perform the second inspection when the information related to the inspection target object satisfies the condition including at least one of: the inspection target object having a concave portion; and the inspection target object being glossy.

Furthermore, the processing condition determination unit 401 can select the second inspection when the inspection target object is moving. As another example, the processing condition determination unit 401 can select the second inspection when the inspection target object is moving faster than a predetermined threshold value. This is because, when generating the normal image using an image of the inspection target object captured during its movement, there is a possibility that the estimation accuracy of the normal line may decrease caused by a shift of the object position due to difference of image capture timings, and blur due to the movement. In the example of FIG. 13, the processing condition determination unit 401 can select the second inspection when "shoot during movement" is selected with the toggle button 1304. As another example, the processing condition determination unit 401 can select the second inspection when "shoot during movement" is selected with the toggle button 1304 and the input moving speed of the workpiece is higher than a predetermined threshold value, in the example of FIG. 13. As such, the processing condition determination unit 401 can determine to perform the second inspection when the information related to the inspection target object satisfies a condition including at least one of: the inspection target object is moving; and the moving speed of the inspection target object has exceeded the threshold value.

In addition, the processing condition determination unit 401 can determine to perform the first inspection when the information related to the inspection target object does not satisfy the condition described above. When, for example, the inspection target object is intended to be shot in a stationary state, the processing condition determination unit 401 can select the first inspection based on the normal image. In addition, the processing condition determination unit 401 can select the first inspection when the inspection surface includes neither a shadow region nor a surface reflection region. The processing condition determination unit 401 can determine that the inspection surface does not have a shadow region when the inspection surface does not have a concave portion. In addition, when the inspection surface is not glossy, the processing condition determination unit 401 can determine that the inspection surface does not have a surface reflection region. In the example of FIG. 13, the processing condition determination unit 401 can select the first inspection when "without concave portion" is selected with the toggle button 1302, "without gloss" is selected with the toggle button 1303, and "shoot stationary object" is selected with the toggle button 1304.

No condition has been set when "automatic" is selected with the toggle button 1301, and therefore the possibility of reduction of the estimation accuracy of the normal line cannot be denied. Therefore, the processing condition determination unit 401 may determine to perform the second inspection without generating the normal image. In addition, the processing condition determination unit 401 may determine to perform the second inspection also in a case where "not specified" has been selected with one of the toggle buttons 1302, 1303, and 1304, for a similar reason.

The process according to the present embodiment can be performed in accordance with the flowchart illustrated in FIG. 12. In the present embodiment, step S501 may be omitted. In addition, the processing condition determination unit 401 selects the first or the second inspection at S1201 in accordance with the user input as described above. When the first inspection is selected, the process proceeds to S1202. When the second inspection is selected, the process proceeds to S1205. Performing the first or the second inspection as described above, realizes inspection of the inspection target object in the present embodiment.

According to the present embodiment as described above, it is possible to inspect the surface profile of the inspection target object by an appropriate inspection method, based on inspection-related conditions set by the user.

Modification Example

A variety of specific examples of the second inspection have been described in the foregoing paragraphs. In addition, a variety of switching methods between the first and the second inspections have also been described. The aforementioned methods can be used in any combination thereof. In the first embodiment, for example, the second inspection is performed based on the reflection image on a shadow region and a surface reflection region, which are a part of the inspection surface. Additionally, in the second embodiment, the second inspection is performed on the entire inspection surface based on the captured image when a shadow region or a surface reflection region has been detected. On the other hand, the second inspection based on the captured image may be performed on a shadow region and a surface reflection region, which are a part of the inspection surface, similarly to the second embodiment. In addition, the second inspection may be performed on the entire inspection surface based on the reflection image similarly to the first embodiment, when a shadow region or a surface reflection region has been detected.

Furthermore, both the first and the second inspections may be performed instead of switching between the first and the second inspections in accordance with the region or the inspection target object, as with the aforementioned embodiments. In such a case, a defect can be detected by combining the results of the first and the second inspections. For example, the results of the first and the second inspections can be used to calculate a weighted average. In such a case, the weight to be used for combination can be adjusted so that the weight of the result of the first inspection in the shadow region or the surface reflection region is smaller than the weight of the result of the first inspection in other regions. In addition, when the inspection surface has a shadow region or a surface reflection region, the weight to be used for combination may be adjusted so that the weight of the result of the first inspection is smaller than when the inspection surface has neither a shadow region nor a surface reflection region.

The shape and the number of filters to be used in the first and the second inspections are not limited to the examples described above. For example, a larger number of filters may be used in the second inspection in order to improve the inspection accuracy. For example, a larger number of filters may be used in the second inspection than in the first inspection. In addition, the appropriate shape (width and size) of the filter may vary depending on the size of the defect occurring on the inspection surface. Therefore, a wider variation of filters may be used when the size or type of the defect that may occur is unknown. In addition, FIGS. 9A to 9D illustrate anisotropic filters suitable for detecting linear defects. However, isotropic filters may also be used. Isotropic filters are suitable for detecting granular defects.

In addition, using a filter for detecting a defect is not essential in the first and the second inspections. For example, a normal image, a reflection image, or a captured image may be preliminarily prepared as a reference image. In such a case, the first detection unit 403 may inspect the surface profile of the inspection target object, based on comparison between a reflection image or a captured image prepared as a reference image, and a reflection image generated by the normal image generation unit 402 or a captured image acquired by the image acquisition unit 1021. In addition, the second detection unit 405 may inspect the surface profile of the inspection target object, based on comparison between a normal image prepared as a reference and a normal image generated by the reflection image generation unit 404.

In addition, the aforementioned embodiments output a map indicating the position of the detected defect as the inspection result. However, the format of output data is not limited thereto. For example, quantitative evaluation values indicating the number, size, or the like, of defects may be output as the inspection result. For example, the quantitative evaluation values can be acquired based on a map. In such a case, the values may be averaged or integrated over the entire map.

In the aforementioned embodiments, the plurality of light sources emit light in sequence to illuminate the inspection target object 204. However, the configuration of the image capturing apparatus 101 is not limited thereto. For example, a plurality of light sources arranged relatively close to each other may simultaneously emit light. In addition, a plurality of light emitting elements may be densely arranged so as to simultaneously emit light as a single light source.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-143176, filed Sep. 4, 2023, which is hereby incorporated by reference herein in its entirety.

What is claimed is:

1. An image processing apparatus comprising:
   one or more memories storing instructions and one or more processors that execute the instructions to:
   (1) acquire a plurality of captured images acquired by shooting an inspection target object under a plurality of illumination conditions;
   (2) determine a region to be inspected by a first inspection and a region to be inspected by a second inspection, respectively, wherein a region that does not have predetermined characteristics on the surface of the inspection target object is a region to be inspected by the first inspection, wherein a region having the predetermined characteristics is a region to be inspected by the second inspection, and wherein the region having the predetermined characteristics is at least one of a shadow region and a surface reflection region;

(3) perform the first inspection for inspecting a surface profile of the inspection target object based on a normal vector direction image indicating a normal vector direction of each position of the inspection target object, the normal vector direction representing a direction perpendicular to a surface of the target object, and the normal vector direction image being generated from the plurality of captured images; and (4) perform the second inspection for inspecting a surface profile of the inspection target object based on the plurality of captured images, the second inspection being different from the first inspection.

2. The image processing apparatus according to claim 1, wherein the one or more processors execute the instructions to perform the first inspection to detect a defect with regard to a surface profile of the inspection target object by performing a filtering process on the normal vector direction image.

3. The image processing apparatus according to claim 1, wherein the one or more processors execute the instructions to perform the second inspection to inspect the surface profile of the inspection target object based on each of the plurality of captured images, or a composite image of the plurality of captured images, without using the normal vector direction image.

4. The image processing apparatus according to claim 1, wherein the one or more processors execute the instructions to perform the second inspection to detect a defect with regard to a surface profile of the inspection target object by performing a filtering process on each of the plurality of captured images or a composite image of the plurality of captured images.

5. The image processing apparatus according to claim 1, wherein the one or more processors execute the instructions to determine a region having the predetermined characteristics on the surface of the inspection target object.

6. The image processing apparatus according to claim 1, wherein the one or more processors execute the instructions to determine a region within the captured image, the region having pixel values included in a predetermined range.

7. The image processing apparatus according to claim 6, wherein the pixel values of pixels in the region in at least one of the plurality of captured images are included in the predetermined range.

8. The image processing apparatus according to claim 1, wherein the one or more processors execute the instructions to determine which of the first or the second inspections is to be performed.

9. The image processing apparatus according to claim 1, wherein the one or more processors execute the instructions to (1) determine to perform the first inspection when no region having predetermined characteristics has been detected on the surface of the inspection target object, and (2) determine to perform the second inspection when a region having the predetermined characteristics has been detected on the surface of the inspection target object.

10. The image processing apparatus according to claim 8, wherein the one or more processors execute the instructions to determine which of the first and the second inspections is to be performed in accordance with information related to the inspection target object which has been set by a user.

11. The image processing apparatus according to claim 10, wherein the information related to the inspection target object indicates at least one of (1) shape characteristics of the inspection target object and (2) surface properties of the inspection target object.

12. The image processing apparatus according to claim 10, wherein the one or more processors execute the instructions to (1) determine to perform the second inspection when the information related to the inspection target object satisfies a condition including at least one of: (a) the inspection target object has a concave portion; and (b) the inspection target object is glossy, and (2) determine to perform the first inspection when the information related to the inspection target object does not satisfy the condition.

13. The image processing apparatus according to claim 10, wherein the information related to the inspection target object indicates at least one of: (1) whether or not the inspection target object is moving; and (2) a moving speed of the inspection target object.

14. The image processing apparatus according to claim 10, wherein the one or more processors execute the instructions to (1) determine to perform the second inspection when the information related to the inspection target object satisfies a condition including at least one of: (a) the inspection target object is moving; and (b) the moving speed of the inspection target object has exceeded a threshold value, and (2) determine to perform the first inspection when the information related to the inspection target object does not satisfy the condition.

15. The image processing apparatus according to claim 10, wherein the one or more processors execute the instructions to cause a display device to display a user interface to be used by a user to input the information related to the inspection target object.

16. An image processing method comprising:

acquiring a plurality of captured images acquired by shooting an inspection target object under a plurality of illumination conditions;

determining a region to be inspected by a first inspection and a region to be inspected by a second inspection, respectively, wherein a region that does not have predetermined characteristics on the surface of the inspection target object is a region to be inspected by the first inspection, wherein a region having the predetermined characteristics is a region to be inspected by the second inspection, and wherein the region having the predetermined characteristics is at least one of a shadow region and a surface reflection region;

performing the first inspection for inspecting a surface profile of the inspection target object based on a normal vector direction image indicating a normal vector direction of each position of the inspection target object, the normal vector direction representing a direction perpendicular to a surface of the target object, and the normal vector direction image being generated from the plurality of captured images; and performing the second inspection for inspecting a surface profile of the inspection target object based on the plurality of captured images, the second inspection being different from the first inspection.

17. A non-transitory computer-readable medium storing a program executable by a computer to cause the computer to:

acquire a plurality of captured images acquired by shooting an inspection target object under a plurality of illumination conditions;

determine a region to be inspected by a first inspection and a region to be inspected by a second inspection, respectively, wherein a region that does not have predetermined characteristics on the surface of the inspection target object is a region to be inspected by the first inspection, wherein a region having the predetermined characteristics is a region to be inspected by the second inspection, and wherein the region having the predetermined characteristics is at least one of a shadow region and a surface reflection region;

perform the first inspection for inspecting a surface profile of the inspection target object based on a normal vector direction image indicating a normal vector direction of each position of the inspection target object, the normal vector direction representing a direction perpendicular to a surface of the target object, and the normal vector direction image being generated from the plurality of captured images; and perform the second inspection for inspecting a surface profile of the inspection target object based on the plurality of captured images, the second inspection being different from the first inspection.

\* \* \* \* \*